UNITED STATES PATENT OFFICE.

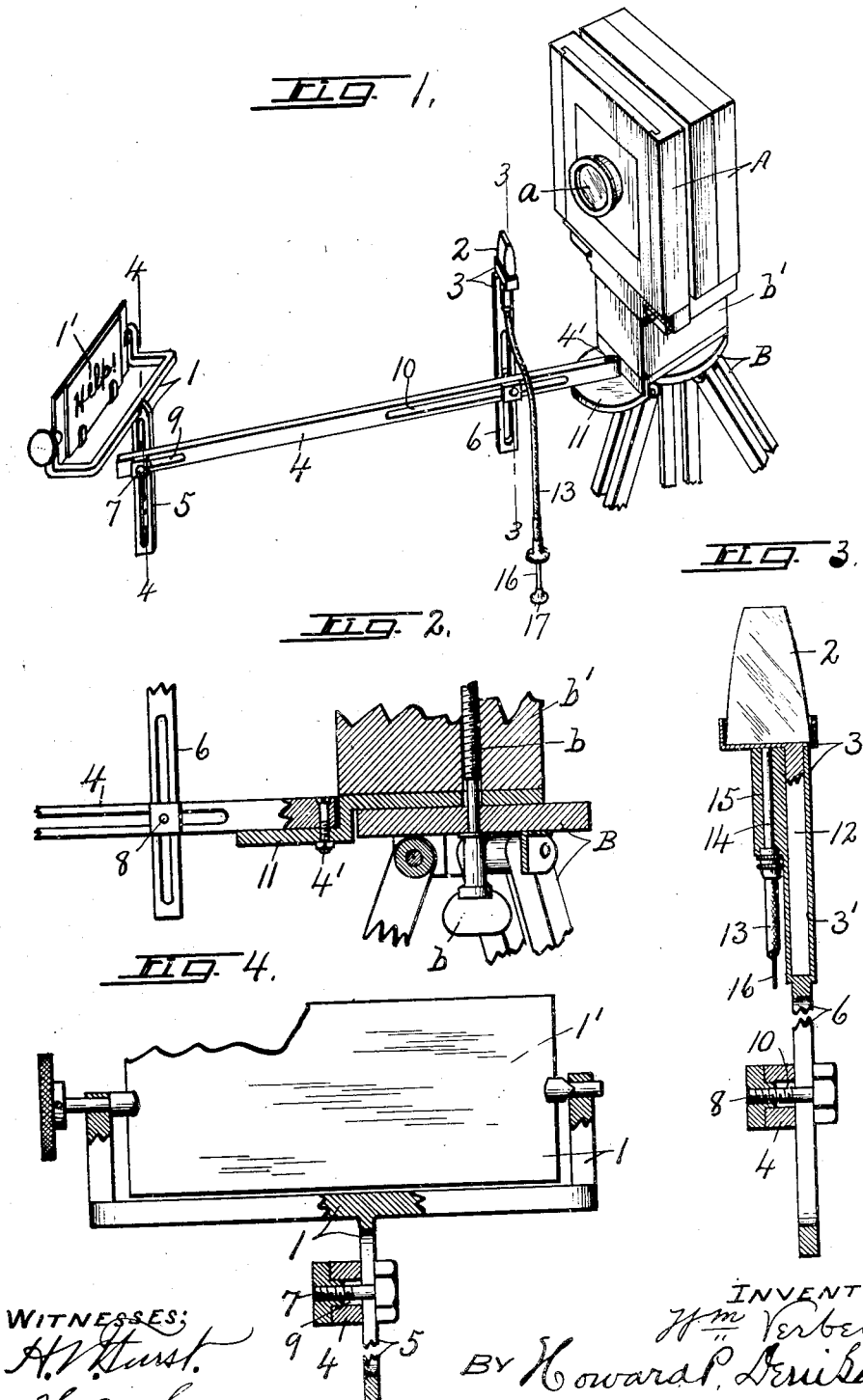

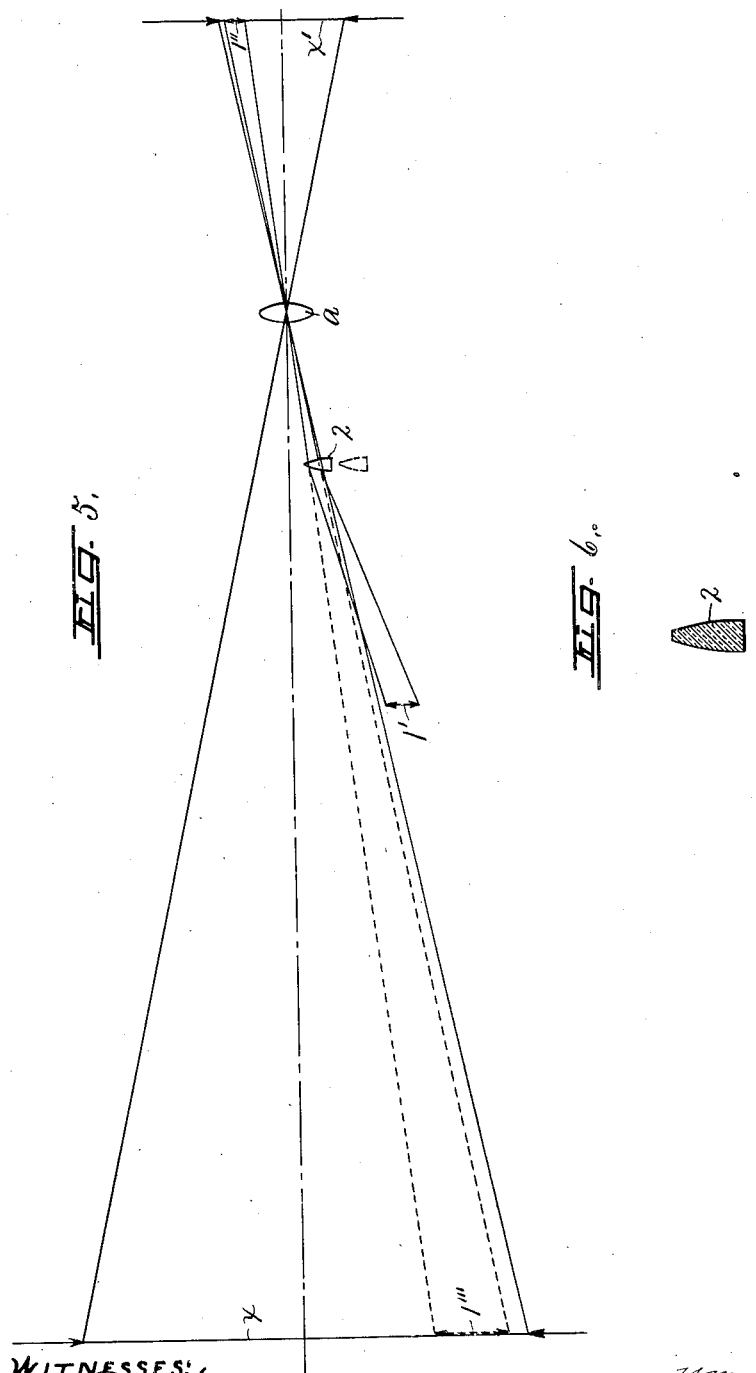

WILLIAM VERBECK, OF MANLIUS, NEW YORK, ASSIGNOR TO KATHERINE J. VERBECK, OF MANLIUS, NEW YORK.

PHOTOGRAPHIC APPARATUS.

1,228,722.   Specification of Letters Patent.   Patented June 5, 1917.

Application filed October 6, 1914. Serial No. 865,312.

*To all whom it may concern:*

Be it known that I, WILLIAM VERBECK, a citizen of the United States, and resident of Manlius, in the county of Onondaga, in the State of New York, have invented new and useful Improvements in Photographic Apparatus, of which the following, taken in connection with the accompanying drawings, in a full, clear, and exact description.

This invention relates to certain improvements in photographic apparatus, involving broadly the use of a camera and means associated therewith for photographically impressing extra matter upon any portion of the negative plate or film of such camera while the latter is focused on other matter in the act of photographing the same so that the complete negative may be reproduced in positive form for use in motion picture machines and other reproducers without in any way mutilating or altering the relative arrangement of the matter as originally impressed on the negative.

In the reproduction of photographic matter, it is frequently desirable to accompany certain acts or scenes with representations of words spoken or other relevant matter which may lend additional interest or impart a better understanding of main features of the exhibition, and the main object, therefore, of my invention is to provide means whereby these results may be obtained in a more efficient and economical manner than has heretofore been practised.

In other words, I have sought to provide a simple device capable of being attached to any camera (and particularly to a motion picture camera) whereby images of any desired matter may be voluntarily brought into the field or visual angle of the camera-lens and photographically impressed on any portion of the negative plate or film in proper relation to certain features of the general scene within such field as reproduced by the camera.

One of the specific objects is to provide the attachment with an object-support and an auxiliary lens adjustable relatively to each other and to the camera-lens so that the auxiliary lens may be properly focused upon such object and the image of said object projected into the lens of the camera for reproduction upon the plate irrespective of but simultaneously with the focusing of the camera-lens upon its object or field.

Other objects and uses relating to specific parts of the invention will be brought out in the following description.

In the drawings—

Figure 1 is a perspective view of a simple form of apparatus for carrying out the objects of my invention and shown as attached to an ordinary camera.

Fig. 2 is a longitudinal vertical sectional view of the head of the tripod of the camera and adjacent portions of the attachment secured thereto.

Fig. 3 is an enlarged vertical sectional view of a portion of the attachment in the plane of the auxiliary lens taken on line 3—3, Fig. 1, except that the auxiliary lens is shown in elevation.

Fig. 4 is an enlarged vertical sectional view partly in elevation of an object-holder associated with the auxiliary lens and forming a part of the attachment taken on line 4—4, Fig. 1.

Fig. 5 is a diagrammatic view of a camera-lens, an auxiliary lens and an object upon which the auxiliary lens is focused, showing how the light rays from such object are directed to the camera-lens.

Fig. 6 is a sectional view of the auxiliary lens.

The invention comprises, in combination with any camera as A, means associated therewith for bringing into the field or angle of vision of the camera-lens —a— any object or matter which it is desired to photographically impress upon the negative plate or film of such camera simultaneously with the object or matter embraced within the field or visual angle of the camera-lens.

As illustrated, this means comprises an object-holder —1— and a light-focusing and refracting medium, as a plano-convex or equivalent converging lens —2—, which is movably mounted upon a supporting arm or bracket —3— so as to be capable of adjustment into and out of the field or visual angle of the camera-lens —a—.

The object-holder —1— and lens-support —3— are both adjustably mounted upon a supporting bar or bracket —4— so as to be capable of vertical and horizontal adjustment, and for this purpose these supports are provided with upright slotted arms —5— and —6—, respectively, for receiving clamping bolts —7— and —8— which are passed through lengthwise slots —9— and —10— in the main supporting bar or bracket —4—, thus permitting relative adjustment of the supports —3— and —4— toward and from each other to properly focus the auxiliary lens —2— upon an object as —1'— on the support —1—, the vertical adjustment of these supports also permitting the object and the lens to be brought into the field or visual angle of the camera-lens if desired.

The main supporting-arm or bracket —4— is hinged at —4'— to a metal plate —11— which is clamped to the head of the tripod as —B— by a clamping screw —b— commonly used to secure the camera to said tripod, but in order that this particular attachment and the camera may be positioned in proper relation to each other, a filling piece —b'— is interposed between the plate —11— and underside of the camera and is held in place by the same clamping screw —b—.

The bolts —7— and —8— also constitute pivots for their respective supports —1— and —3—, whereby said supports together with the object —1'— and the lens —2— carried thereby, although normally out of the field of the camera-lens —a— may be tilted to such an angle that the rays of light from the object —1'— may be refracted into said field or rather into the camera-lens —a— without actually moving those parts into said field.

In the illustrated embodiment of my invention, the attachment is placed in a plane below that of the camera-lens, the object-support being preferably set to hold the object at a predetermined level in the focal plane of the auxiliary lens —2—.

The lens-support —3— is provided with a vertically slidable section —12— guided in a socket —3'— in the part which is attached to the arm or bracket —4—, the upper end of said section being enlarged to receive the lower end of the auxiliary lens —2— and overhanging a portion of the lower section to limit the downward movement of the lens.

Any suitable means may be provided for voluntarily moving the slidable section of the lens-support with the lens thereon vertically to bring the refracted rays of light of the object —1'— into the field or visual angle of the camera-lens —a—, and for this purpose, I have provided the lens-support with a hollow flexible tube —13— secured at one end thereto in alinement with a vertically moving plunger —14— which is guided in a vertical aperture —15— in said support directly under the overhanging head of the sliding section —12—.

A flexible wire plunger —16— is passed through the tube —13— to engage the lower end of the plunger —14—, the lower end of said wire —16— being extended some distance below the lower end of the tube —13— and being provided with a finger-piece —17— adapted to be engaged by the operator for forcing the wire upward, and thereby elevating the plunger —14— and lens-holding section —12— to cause said lens to refract the rays of light into the camera-lens, whenever the operator may deem it necessary or desirable to impress an image of such object upon the negative plate or film of the camera simultaneously with that which is embraced within the field or visual angle of the camera-lens, it being understood that this extra image of the object which is below the field of vision will appear in the upper portion of the negative in an inverted position and that this image of the object —1'— may be impressed in any position on the negative plate or film from side to side by simply rocking the bracket —4— laterally in one direction or the other.

It is also obvious that the auxiliary lens —2— and object-holder —1— may be positioned a greater or less distance from the camera without affecting the distinctness of the supplemental image impressed on the negative plate or film so long as the auxiliary lens —2— is properly focused on the object —1'—.

In the diagrammatic view shown in Fig. 5, let —X— represent the field and —X'— the sensitized surface upon which the field is to be photographed.

Now, assuming that it is desired to photograph the object as —1'— outside of the field upon the sensitized surface in a certain position, as at —1"—, then the operator would move the lens —2— into the field or into such position that the light rays from the object —1'— falling upon such lens would be directed through the camera-lens —a— to the desired position on the sensitized surface, under which conditions the object —1'— would appear to be elevated in the field to the position shown at —1"'—.

That is, the operator first determines where in the field it is desired to have the external object appear so that it may be impressed in a similar position, but in reverse order, on the sensitized plate, after which the external object, as —1'—, and the lens —2— are adjusted in proper focus and in the desired relation to the field so as to permit such lens to be moved into position to intercept light rays which would pass from the imaginary object —1″'— through the camera-lens —a— and on to the sensitized plate, as at —1″—, the convex side of the lens facing the object —1'— while the plano side faces the camera-lens to refract the focused rays of light at the desired angle through the camera-lens.

In operation, whether for taking motion pictures or for other purposes, the camera is first adjusted or focused upon the object or matter to be photographed thereby, and the supplemental object —1'—, which is to be impressed upon the negative plate or film simultaneously with the taking of the impression of the field upon which the camera is focused, is then brought into focus of the auxiliary lens —2— and at the proper time during the exposure of the main field, the auxiliary lens may be forced into position to refract rays of light from the object into the camera-lens, thereby producing in a single exposure and upon the same negative the photograph of the object as well as the field upon which the camera is focused, the position of the extra image being predetermined by properly positioning the bracket —4— carrying the object and the auxiliary lens.

The purpose in using the auxiliary lens is to permit the simultaneous photographing of matter at widely different distances from the lens of the camera, and at the same time to facilitate the manipulation of the extra object to any position so as to impress its image in any desired position upon the negative plate or film, irrespective of the distance of the main field from the lens of the camera.

From the foregoing description, it will be apparent that any extra object which it is desired to impress upon the negative plate or film without the use of the auxiliary lens may be positioned in some part of the plane of the field upon which the camera is focused which is within the scope of my present invention.

What I claim is:

1. In combination with a photographic camera, means for photographing an object outside of the field of the camera simultaneously with the photographing of such field, said means including a light-refracting medium focused on said object and adjustable to direct the rays of light from said object into and out of the field of the camera-lens.

2. In combination with a photographic camera, means for photographing an object outside of the field of the camera-lens simultaneously with the photographing of said field, said means including an auxiliary lens focused on said object, and means for moving the auxiliary lens into and out of said field.

3. The combination with a photographic camera, of a converging lens adjustable to focus upon an object outside of the camera-field, and means for moving said lens into and out of said field while it is focused on said object.

4. In combination with a photographic camera, means for supporting an object outside of the field of the camera and at a different distance therefrom than that for which the camera is focused, and a light-refracting medium focused on said object and adapted to be positioned so as to direct the rays of light from said object to the camera-lens for impressing the image of said object upon the sensitized member simultaneously with the photographing of the field.

5. The combination with a photographic camera, of a converging lens, means for adjusting said lens to focus upon an object outside of the field of the camera, separate means for adjusting the lens into and out of such field while focused on said object.

6. In combination with a photographic camera and a support therefor, an arm pivoted to the support to swing horizontally, means on the arm for supporting an object to be photographed, a light-refracting medium, and a support therefor mounted on the arm between the object-supporting means and lens of the camera, said refracting-medium adapted to be positioned so as to direct rays of light from said object to said lens.

7. In combination with a photographic camera, means for supporting an object to be photographed to one side of the field of the camera-lens, and a light-refracting medium focused on the object and adjustable relatively to the object-support so as in one position to throw refracted rays from said object into the field, and in another position to throw them out of such field.

8. In combination with a photographic camera, means for supporting an object to be photographed to one side of the field of the camera-lens and tiltable to different angles relatively to the axis of said field, and a light-refracting medium between the object-support and lens for directing rays from such object to the lens.

9. In combination with a photographic camera, means for supporting an object to be photographed to one side of the field of the camera-lens, a light-refracting medium focused on the object between the object-support and lens for directing the rays of light from said object to the lens, and means for adjusting the light-refracting medium to different angles relatively to the axis of said field.

10. In combination with a photographic camera, adjustable means for supporting an object to be photographed outside of the field of the camera-lens, a light-refracting medium interposed between the object support and lens and adjustable so as in one position to throw the refracted rays from said object into the field, and in another position to throw them out of such field, and means for adjusting the light-refracting medium relatively toward and away from the object-support for focusing the same on the object.

In witness whereof I have hereunto set my hand this 30th day of September 1914.

WILLIAM VERBECK.

Witnesses:
H. E. CHASE,
ALICE M. CANNON.